US012056496B2

United States Patent
Diamand et al.

(10) Patent No.: US 12,056,496 B2
(45) Date of Patent: Aug. 6, 2024

(54) FAST BOOT SYSTEM

(71) Applicant: ROKU, INC., San Jose, CA (US)

(72) Inventors: Luke Diamand, Sunnyvale, CA (US); Caroline Gan Lazovick, San Jose, CA (US); Wade Brown, San Jose, CA (US); Khoa Hoang, San Jose, CA (US); Karthick Narayanan, San Jose, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 17/898,838

(22) Filed: Aug. 30, 2022

(65) Prior Publication Data

US 2024/0069922 A1 Feb. 29, 2024

(51) Int. Cl.
| | |
|---|---|
| *G06F 9/4401* | (2018.01) |
| *G06F 8/61* | (2018.01) |
| *G06F 8/65* | (2018.01) |
| *G06F 9/445* | (2018.01) |
| *G06F 11/14* | (2006.01) |
| *G06F 21/60* | (2013.01) |

(52) U.S. Cl.
CPC ............. *G06F 9/4401* (2013.01); *G06F 8/65* (2013.01); *G06F 21/602* (2013.01); *G06F 8/63* (2013.01); *G06F 9/4418* (2013.01); *G06F 9/445* (2013.01); *G06F 11/1446* (2013.01)

(58) Field of Classification Search
CPC ........ G06F 9/4401; G06F 8/65; G06F 9/4418; G06F 9/445; G06F 8/63; G06F 11/1446; G06F 21/602
USPC .................................................. 713/1, 2, 100
See application file for complete search history.

(56) References Cited

U.S. PATENT DOCUMENTS

| | | | | |
|---|---|---|---|---|
| 9,003,000 B2* | 4/2015 | Currid | ................... | G06F 9/4416 709/229 |
| 2011/0087896 A1* | 4/2011 | Thom | ..................... | G06F 21/34 713/193 |
| 2012/0096256 A1* | 4/2012 | Kim | ....................... | G06F 9/4406 713/2 |
| 2013/0042097 A1* | 2/2013 | Baik | ..................... | G06F 9/4401 713/2 |
| 2014/0068240 A1* | 3/2014 | Nightingale | .......... | G06F 9/4406 713/1 |

(Continued)

OTHER PUBLICATIONS

International Search Report and Written Opinion of the International Searching Authority directed to related International Patent Application No. PCT/US2023/072261, mailed Dec. 7, 2023; 7 pages.

*Primary Examiner* — Ji H Bae
(74) *Attorney, Agent, or Firm* — Sterne, Kessler, Goldstein & Fox P.L.L.C.

(57) ABSTRACT

Disclosed herein are various embodiments, for a fast boot system. An example embodiment operates by determining that one or more programs have been loaded into memory on a boot-up of a device. A snapshot of the memory including the loaded one or more programs is captured. Operations of the device are monitored after the snapshot has been captured. It is determined that a first program of the one or more programs was updated during the monitoring. A restart of the device is detected, wherein the snapshot is loaded into the memory in lieu of loading the one or more programs, and wherein the first program is updated during the restart of the device.

18 Claims, 5 Drawing Sheets

(56) References Cited

U.S. PATENT DOCUMENTS

| | | | |
|---|---|---|---|
| 2014/0201728 A1* | 7/2014 | Du Toit | G06F 8/65 |
| | | | 717/171 |
| 2014/0297998 A1 | 10/2014 | Kang | |
| 2014/0344563 A1 | 11/2014 | Kim et al. | |
| 2016/0162278 A1 | 6/2016 | Kondik et al. | |
| 2019/0018475 A1 | 1/2019 | Silva et al. | |
| 2019/0227710 A1* | 7/2019 | Li | G06F 11/1448 |
| 2020/0026524 A1 | 1/2020 | Roland et al. | |
| 2022/0066766 A1* | 3/2022 | Mysore Shantamurthy | |
| | | | G06F 9/45558 |

* cited by examiner

FAST BOOT SYSTEM

BACKGROUND

User devices, such as SMART televisions and streaming media players, often take an extended time to boot up because of the multitude of programs that often need to be loaded into memory. Each time the device is rebooted, the programs operating on the device need to be loaded back into memory, and this wastes computing resources and time. Users who are starting these devices, from a reboot or power off state, have little choice but to wait until the boot process of the device has completed before they can begin using the device. This wait time during a cold boot often degrades the user's experience with the device and may also consume unnecessary resources. It would be beneficial to reduce the time it takes for a device to cold boot and reduce the resources required for the boot process.

SUMMARY

Provided herein are system, apparatus, article of manufacture, method and/or computer program product embodiments, and/or combinations and sub-combinations thereof, for a fast boot system.

An example embodiment operates by determining that one or more programs have been loaded into memory on a boot-up of a device. A snapshot of the memory including the loaded programs is captured. Operations of the device are monitored after the snapshot has been captured. It is determined that a first program of the programs was updated during the monitoring. A restart of the device is detected, wherein the snapshot is loaded into the memory in lieu of loading the one or more programs, and wherein the first program is updated during the restart of the device.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for a fast boot system.

Figure 1:
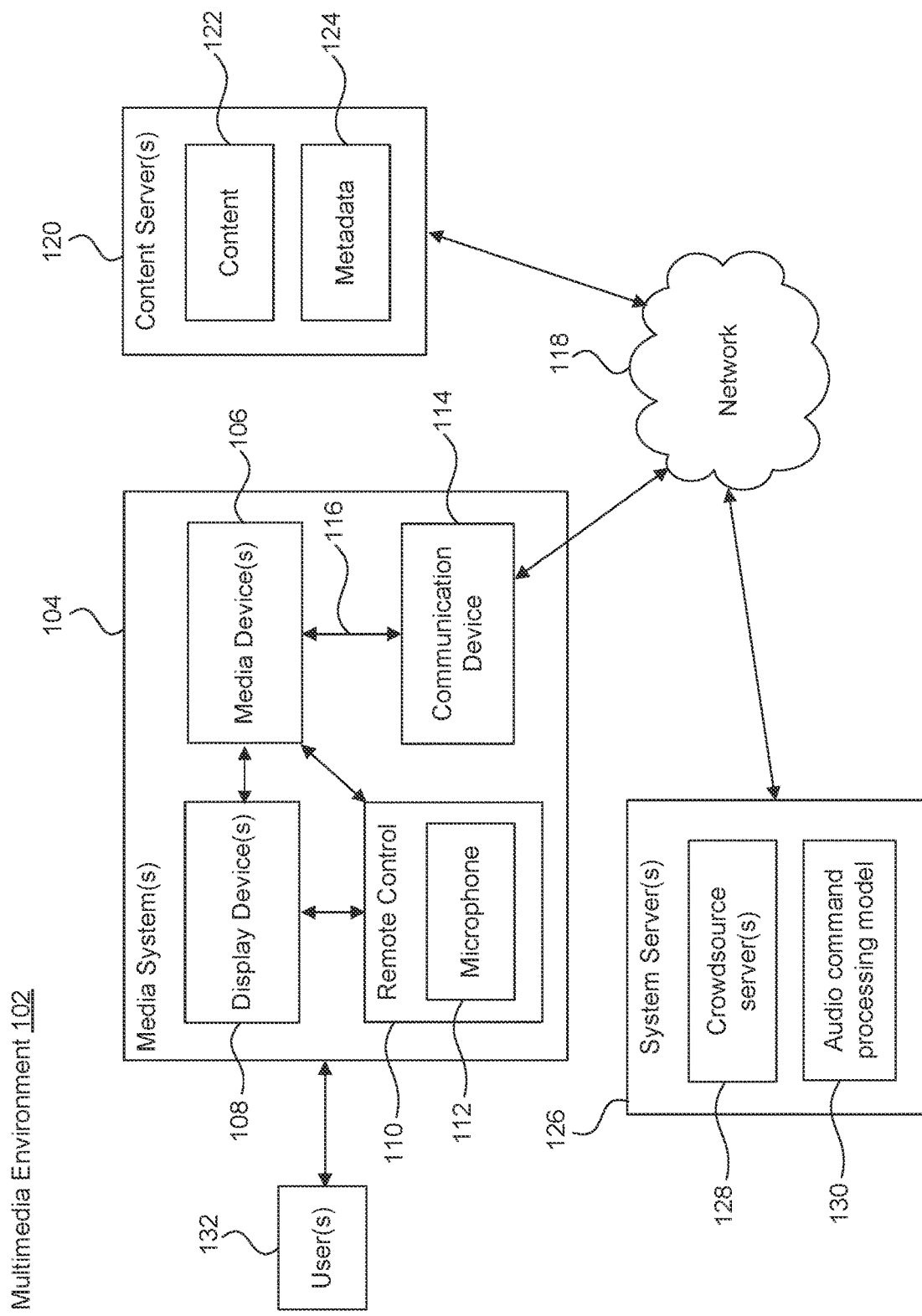
FIG. 1 illustrates a block diagram of a multimedia environment, according to some embodiments.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as Wi-Fi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the verbal command of user 132. The audio command processing module 130 may then forward the verbal command back to the media device 106 for processing.

Figure 2:
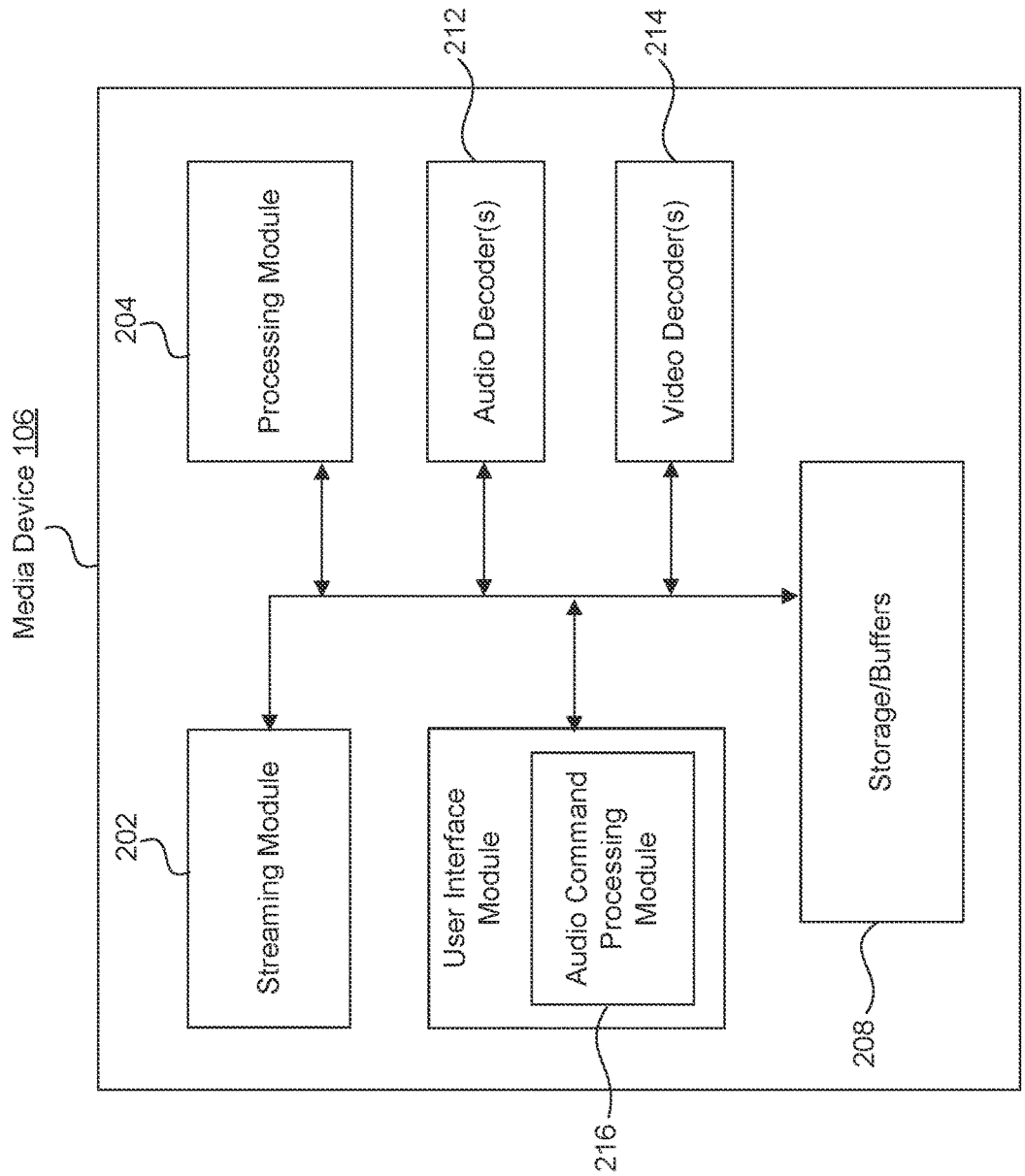
FIG. 2 illustrates a block diagram of an example media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Fast Boot System

User devices, such as SMART televisions and streaming media players, often take an extended period of time to boot up because of the plurality of programs that often need to be loaded into memory. Each time the device is rebooted, the programs operating on the device need to loaded back into memory which wastes computing resources and time. The users are who are starting these devices, from a reboot or power off state, have little choice but to wait until the boot process of the device has completed before they can begin using the device. This wait time during a cold boot often degrades the user's experience with the device and may also consume unnecessary resources. It would be beneficial to reduce the time it takes for a device to cold boot and reduce the resources required for the boot process.

Figure 3:
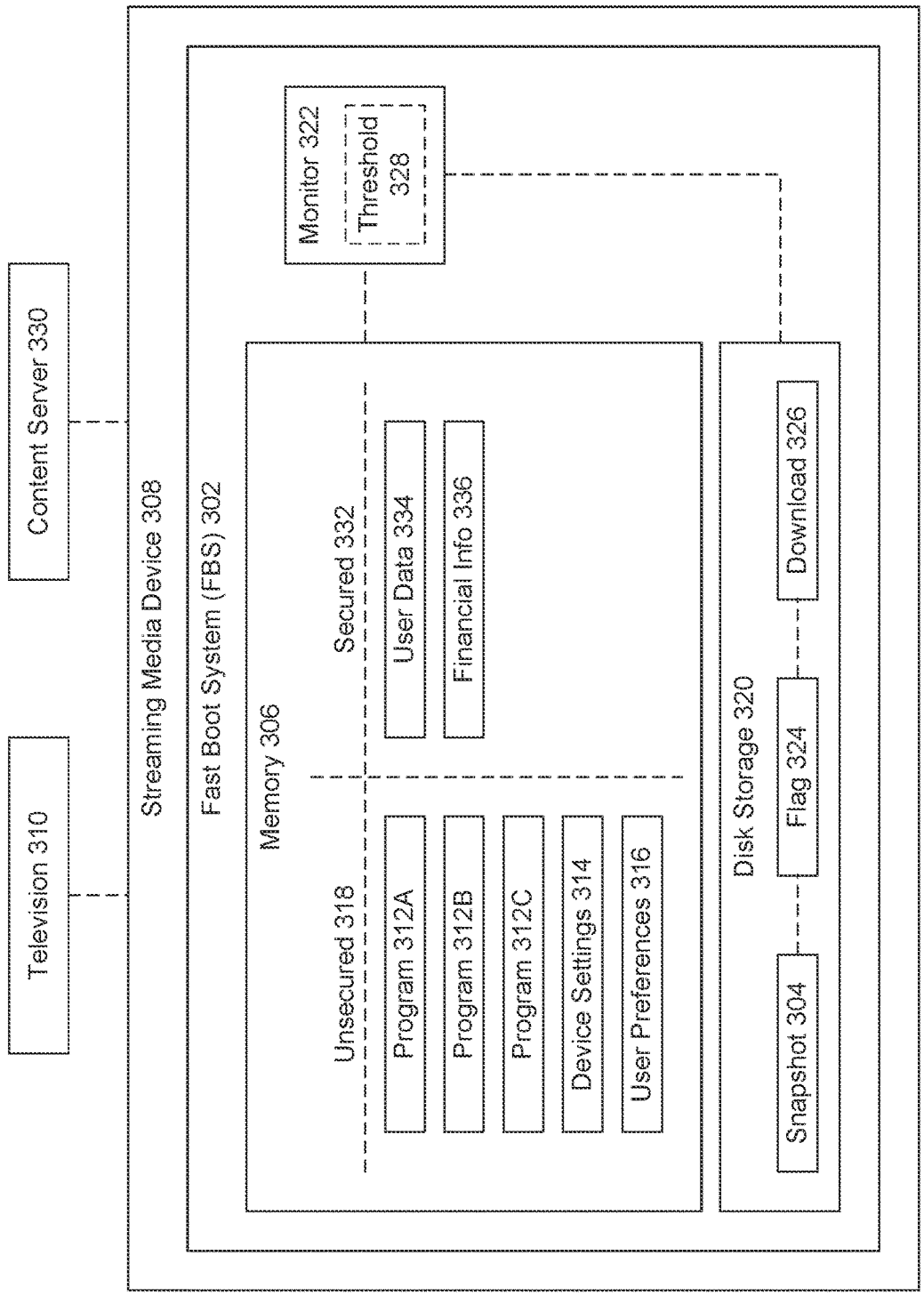
FIG. 3 is a block diagram illustrating an example fast boot system (FBS), according to some example embodiments.

FIG. 3 is a block diagram 300 illustrating a fast boot system (FBS) 302, according to some example embodiments. FBS 302 may be a system that reduces the boot time and/or computing resources used in booting or starting a user device. In some embodiments, FBS 302 may take a snapshot 304 of a memory 306 of a device to use during the boot up of the device.

The device may include any user device or computing device that loads programs into memory 306 as part of its boot up procedure. Some example devices on which FBS 302 may be connected or integrated include a streaming media device 308 (or 106), a SMART television (which may represent display device 108), laptop, or any internet of things (IoT) device.

The streaming media device 308 may include a streaming media player connected to or integrated with a monitor or television 310. In some embodiments, streaming media device 308 may be connected to television 310 through a universal serial bus (USB) or a high-definition multimedia interface (HDMI) cable. In some embodiments, the connection between streaming media device 308 and television 310 may be wireless or over a network. In some embodiments, streaming media device 308 may include a streaming media platform that is executing on or integrated with the firmware or software of television 310.

During a normal, non FBS, or cold boot procedure, the streaming media device 308 may load a variety of different programs 312A-C, device settings 314, and user preferences 316 into an unsecured portion of memory 306 (referred to herein as unsecured memory 318). Loading this various data into unsecured memory 318 uses computing resources and may take a long time and may consume various computing resources on each boot up. During this time, a user 321 must simply wait for the streaming media device 308 (referred to also as device 308) to complete its boot-up procedure before the user 321 can begin using the device 308.

However, because the same programs and data are often loaded into memory 306 during each boot procedure, FBS 302 may take a snapshot 304 of memory 306 after at least a portion of the data or programs have been loaded into memory 306, and that snapshot 304 may be used on subsequent boot commands (e.g., on device restart, reboot, power off/power on) to reduce the boot time and consume fewer computing resources and bandwidth during the boot process.

In some embodiments, programs 312A-C may include apps, programs, web services that may be loaded. For example, for streaming media device 308, programs 312A-C may include various streaming services, such as NETFLIX, HULU, DISNEY PLUS, HBO MAX, etc. Or, for example, programs 312A-C may include any other apps that may be downloaded to and executed on device 308. Device settings 314 may include any particular settings for device 308 such as WI-FI and local network settings. User preferences 316 may include different user specific, or user-specified options such as color, theme, text size, and background.

Snapshot 304 may include a state of the memory 306 after one or more of programs 312A-C, device settings 314, and user preferences 316 have been loaded into memory 306 (or unsecured memory 318). If a snapshot 304 exists in a disk storage 320 location, then on the next reboot of device 308, FBS 302 or device 308 may retrieve and load the snapshot 304 into memory 306 in lieu of downloading and/or separately installing each of the programs 312A-C into memory 306. Loading the snapshot 304 may be a faster, less resource intensive process, than individually loading various programs 312A-C into memory 306.

Then, for example, after snapshot 304 is loaded into memory 306, only device settings 314 and user preferences 316 may need to be loaded into memory 306 prior to allowing the user 321 to use the device 308. In some embodiments, snapshot 304 may include device settings 314 and/or user preferences 316 as well—such that nothing new may need to be loaded into memory 306 beyond snapshot 304.

In some embodiments, on a first cold boot, FBS 302 may take a snapshot 304 of memory 306, after programs 312A-C have been loaded into memory 306. In some embodiments, FBS 302 may automatically take snapshot 304 of memory 306 without a user prompt or action—such as a user action that indicates a hibernate or sleep command on device 308. Or, for example, snapshot 304 may be captured prior to device 308 recognizing or responding to any commands from user 321.

On a conventional laptop, when a user selects the hibernate function or a particular amount of time has passed, the operating system of the laptop may take a snapshot of the memory of the laptop to use when the laptop is 'woken up' or used again (if it not powered down first). The cue for when to capture the snapshot in a conventional laptop is based on user activity or inactivity. By contrast, FBS 302 may be configured to take a snapshot 304 of memory 306 during or immediately after a boot process, prior to any user activity or inactivity, or prior to device 308 being ready to receive and execute user commands, and may store snapshot 304 on disk storage 320 in lieu of memory 306. In some embodiments, the disk storage 320 may include a (removable) multimediacard (MMC) or embedded multimediacard (eMMC). The MMC or eMMC may provide a low-cost flash-memory system with a built-in controller which may appear to its how as a bootable device, in lieu of a more expensive form of solid-state storage or a traditional sold-state drive.

In some embodiments, FBS 302 may be configured to take a snapshot 304 after a certain number of programs 312A-C have been loaded into memory, prior to or after device settings 314 or user preferences 316 have been loaded into memory, after a certain amount of time after boot up, or once a certain amount of threshold memory 306 has been occupied with programs and data. In some embodiments, the trigger or cue for when to capture snapshot 304 may be configured by a user 321.

Memory 306 may be volatile storage that resets or clears on a power off or system reboot command. Disk storage 320 may be non-volatile storage space that is persisted even when the device 308 loses power or is restarted/rebooted. FBS 302 may store snapshot 304 in disk storage 320 so that the snapshot 304 is available during the next boot of device 308, even during a subsequent cold boot of the device (e.g., when memory 306 has been cleared).

As indicated above, FBS 302 may take or capture snapshot 304 during or after the boot process and before the user 321 has performed any interactions with streaming media device 308. During the normal functionality of streaming media device 308, the user 321 or device 308 may perform operations that change the data that has been loaded into memory 306 during the boot process (e.g., programs 312A-C, device settings 314, and/or user preferences 316). However, since snapshot 304 has already been captured, these changes may need to be accounted for so that the user 321 sees the most up-to-date state of streaming media device 308 on their next boot of device 308.

A monitor 322 may monitor the operations of streaming media device 308 and/or memory 306 for changes to the data or programs stored in memory 306 during the boot process. These changes may include for example, installing new programs, updating or deleting existing programs 312A-C, updating device settings 314 and/or user preferences 316. In some embodiments, when a memory-affecting change is detected, a flag 324 may be set.

In some embodiments, monitor 322 may ignore any changes to data that may have been loaded into or out of data after the boot process (e.g., runtime data), unless it affects what data was captured as part of snapshot 304. In some embodiments, monitor 322 may be configured to detect a particular set of enumerated changes, such as adding a new program, updating a version of a program, deleting an existing program, or updating the user preferences 316. If any of these enumerated changes are detected, a flag 324 may be set.

Flag 324 may indicate which program 312A-C or other portion or data of snapshot 304 needs to be updated based on the monitored operations performed by user 321 and/or device 308. For example, if program 312A is updated to a new version, then a flag 324 for program 312A (which was saved in snapshot 304) may be set. If program 312C is deleted, similarly, a flag 324 may be set for program 312C.

In some embodiments, if a flag 324 is set for a new program or updated version of a program, that new program or updated version may be downloaded from one or more content servers 330 as download 326 as a background process while device 308 is operational. On the next reboot, snapshot 304 may be loaded from disk storage 320 into memory 306, and FBS 302 may check to see if any flags 324 have been set. Having pre-downloaded a program as download 326 may save resources that may otherwise be required to download the new versions or programs from one or more content servers 330 on the next reboot. The download 326 may then be installed on the boot procedure.

If a flag 324 has been set, then FBS 302 may cause device 308 to perform a corresponding action to that flag 324. These actions may include deleting a program from memory, installing the download 326, or other actions. Once these flagged actions have been performed, FBS 302 may capture a new snapshot 304 including the updates to replace the old snapshot 304. FBS 302 may also reset any flag 324, or the new snapshot 304 would not have any flags 324 set. FBS 302 may also delete the downloads 326 to preserve storage space in disk storage 320 once the downloaded program has been installed or captured as part of an updated snapshot 304.

In some embodiments, if the number of changes to memory 306 detected or the number of flags 324 set during functionality of device 308 (e.g., after snapshot 304 has been loaded into memory 306) exceeds a threshold 328, then a new snapshot 304 of memory 306 may be taken or captured as a background process (e.g., without user prompt or notification), and the new snapshot 304 may be used on the next reboot. Any flags 324 which have been rendered irrelevant with the new snapshot 304 may then be cleared. In some embodiments, any changes to memory 306 affecting the data or programs of snapshot 304 (which may include installation of new programs) may result in FBS 302 taking a new snapshot 304 in addition to or in lieu of setting flags 324.

In some embodiments, memory 306 may include both an unsecured portion of memory 318 and a secured portion of memory 332. Unsecured memory 318 may store data that is not generally considered sensitive information, such as downloaded channels, apps, or programs 312A-C and settings information (e.g., 314 and 316). However, there may be other data is considered personal, private, or confidential for which FBS 302 provides increased security, such as user data 334 and financial information 336. User data 334 may include information such as user name, location, age, password, etc. Financial information 336 may include purchases, purchase history, credit card information, etc. In some embodiments, the secured memory 332 may be used to store device and/or manufacturer-specific cryptographic keys—in addition, or in lieu of the user data 334 and financial information 336.

As indicated above, snapshot 304 may be an image of memory 306. However, if memory 306 includes secured memory 332 with sensitive data, snapshot 304 may only be an image of the unsecured memory 318. Thus, any sensitive data (e.g., user data 334 or financial info 336, or cryptographic key information) may either be excluded or removed from snapshot 304. In some embodiments, this sensitive data 334, 336 (which may include cryptographic key information) may be stored in a protected part of disk storage 320 or downloaded from a secured content server 330 on reboot. Excluding this sensitive information 334, 336 from snapshot 304 may help increase security in case authorized users gain access to snapshot 304. In some embodiments, FBS 302 may encrypt snapshot 304, and then on the next reboot, prior to snapshot 304 being loaded into memory, FBS 302 may decrypt snapshot 304.

Figure 4:
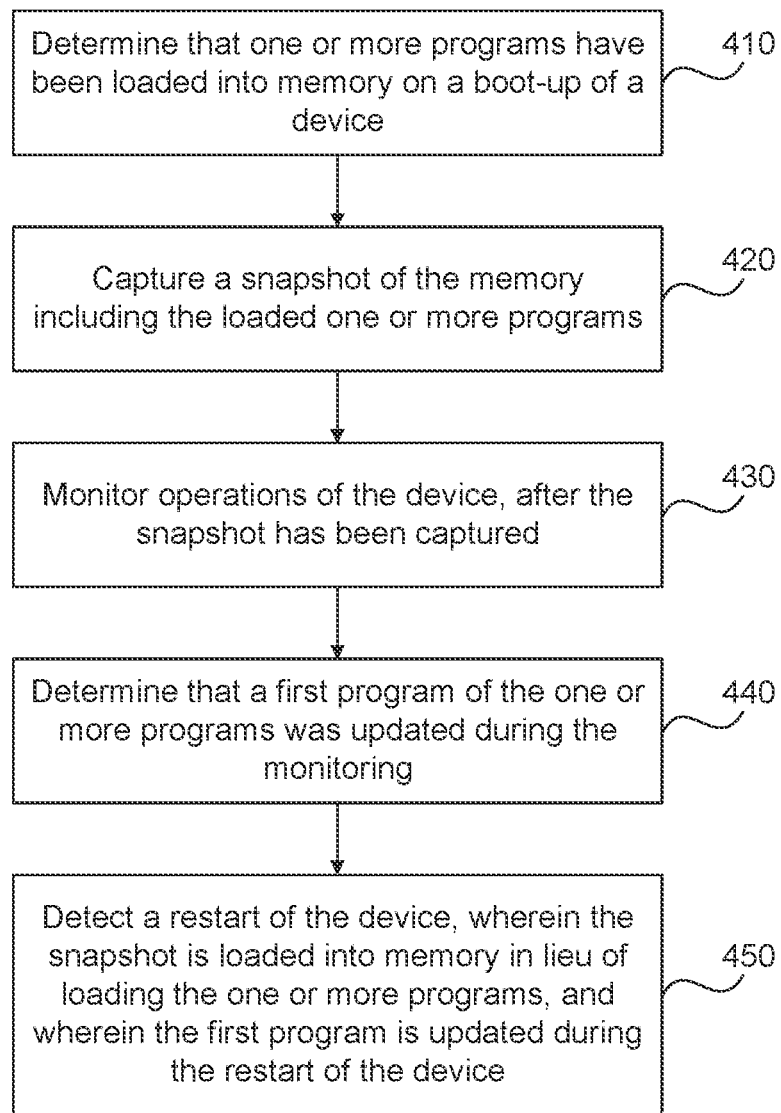
FIG. 4 is a flowchart illustrating example operations for a fast boot system (FBS), according to some embodiments.

FIG. 4 is a flowchart 400 illustrated example operations for a fast boot system (FBS) 302, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 400 shall be described with reference to FIG. 3. However, method 400 is not limited to that example embodiment. For example, and without limitation, method 400 could also be applied to the example embodiment shown in FIG. 1.

In step 410, it is determined that one or more programs have been loaded into memory on a boot-up of a device. For example, FBS 302 may determine that programs 312A-C have been loaded into memory 306.

In step 420, a snapshot of the memory including the loaded one or more programs is captured. For example, FBS 302 may take a snapshot 304 of memory 306. In some embodiments, if user data 334, financial info 336, or other sensitive information has been stored in secured memory 332, then that data may be excluded from snapshot 304.

In step 430, operations of the device are monitored after the snapshot has been captured. For example, monitor 322 may monitor user operations during functionality of device 308.

In step 440, it is determined that a first program of the one or more programs was updated during the monitoring. For example, monitor 322 may detect that one of the programs 312A-C has been updated and set a flag 323 accordingly. In some embodiments, the new version of the updated program 312A-C may be downloaded from the content server 330, as download 326. Then, for example, on the next reboot, download 326 may be installed and a new snapshot 304 may be taken.

In step 450, a restart of the device is detected, wherein the snapshot is loaded into memory in lieu of loading the one or more programs, and wherein the first program is updated during the restart of the device. For example, FBS 302 may check to see if a snapshot 304 exists in disk storage 320. If no snapshot 304 exists, then a normal boot procedure may be followed and a new snapshot 304 may be captured of memory 306 (or unsecured memory 318). If, however, snapshot 304 is detected, then snapshot 304 may be decrypted (if needed), loaded into unsecured memory 318, sensitive information (if any) may be loaded into secured memory 332, FBS 302 may perform a handshaking procedure between unsecured memory 318 and secured memory 332, and the device 308 may be made available to user 321.

Example Computer System

Figure 5:
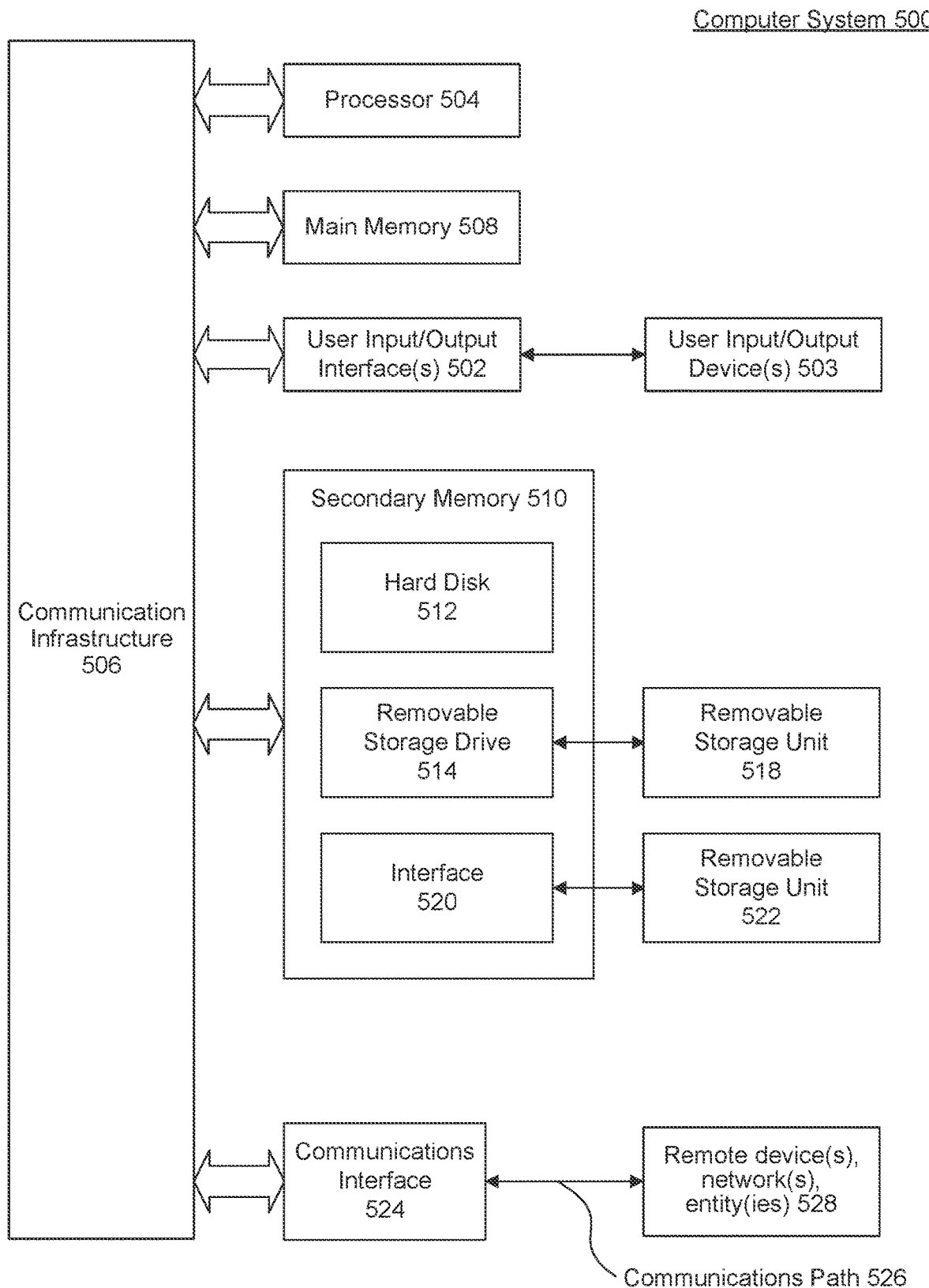
FIG. 5 illustrates an example computer system useful for implementing various embodiments.

Various embodiments may be implemented, for example, using one or more well-known computer systems, such as computer system 500 shown in FIG. 5. For example, the media device 106 may be implemented using combinations or sub-combinations of computer system 500. Also or alternatively, one or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 700 or processor(s) 704), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
   determining, by at least one processor, that one or more programs have been loaded into memory on a boot-up of a device;
   capturing a snapshot of the memory including the loaded one or more programs, wherein the memory comprises an unsecured portion and a secured portion, and wherein the snapshot excludes the secured portion of the memory;
   monitoring operations of the device, after the snapshot has been captured;
   determining that a first program of the one or more programs was updated during the monitoring; and
   detecting a restart of the device, wherein the snapshot is loaded into the memory in lieu of loading the one or more programs, and wherein the snapshot is updated in accordance with the update of the first program during the restart of the device.

2. The method of claim 1, further comprising:
   setting a flag corresponding to the determination that the first program was updated.

3. The method of claim 2, wherein the determining the restart comprises:
   determining that the flag was set for the first program; and
   updating the first program after the restart and after loading the snapshot into the memory.

4. The method of claim 3, further comprising:
   capturing a new snapshot to replace the snapshot of the memory, the new snapshot including the update to the first program, and wherein the new snapshot is used during a subsequent restart of the device.

5. The method of claim 1, further comprising:
   downloading the update to the first program prior to detecting the restart, wherein the downloaded update to the first program is used during the restart of the device.

6. The method of claim 1, wherein the capturing comprises:
   encrypting the snapshot; and
   wherein the detecting the restart comprises decrypting the encrypted snapshot.

7. The method of claim 1, further comprising:
   loading secured data into the secured portion of the memory after the snapshot has been loaded into the unsecured portion of the memory.

8. The method of claim 1, wherein the device comprises a streaming media device, and wherein the one or more programs comprise one or more streaming media apps configured to operate on the streaming media device.

9. A system, comprising at least one processor configured to perform operations comprising:
   determining that one or more programs have been loaded into memory on a boot-up of a device;
   capturing a snapshot of the memory including the loaded one or more programs, wherein the memory comprises an unsecured portion and a secured portion, and wherein the snapshot excludes the secured portion of the memory;
   monitoring operations of the device, after the snapshot has been captured;
   determining that a first program of the one or more programs was updated during the monitoring; and
   detecting a restart of the device, wherein the snapshot is loaded into the memory in lieu of loading the one or more programs, and wherein the snapshot is updated in accordance with the update of the first program during the restart of the device.

10. The system of claim 9, the operations further comprising:
setting a flag corresponding to the determination that the first program was updated.

11. The system of claim 10, wherein the determining the restart comprises:
determining that the flag was set for the first program; and
updating the first program after the restart and after loading the snapshot into the memory.

12. The system of claim 11, the operations further comprising:
capturing a new snapshot to replace the snapshot of the memory, the new snapshot including the update to the first program, and wherein the new snapshot is used during a subsequent restart of the device.

13. The system of claim 9, the operations further comprising:
downloading the update to the first program prior to detecting the restart, wherein the downloaded update to the first program is used during the restart of the device.

14. The system of claim 9, wherein the capturing comprises:
encrypting the snapshot; and
wherein the detecting the restart comprises decrypting the encrypted snapshot.

15. The system of claim 9, the operations further comprising:
loading secured data into the secured portion of the memory after the snapshot has been loaded into the unsecured portion of the memory.

16. The system of claim 9, wherein the device comprises a streaming media device, and wherein the one or more programs comprise one or more streaming media apps configured to operate on the streaming media device.

17. A non-transitory computer-readable medium having instructions stored thereon that, when executed by at least one computing device, cause the at least one computing device to perform operations comprising:
determining that one or more programs have been loaded into memory on a boot-up of a device;
capturing a snapshot of the memory including the loaded one or more programs, wherein the memory comprises an unsecured portion and a secured portion, and wherein the snapshot excludes the secured portion of the memory;
monitoring operations of the device, after the snapshot has been captured;
determining that a first program of the one or more programs was updated during the monitoring; and
detecting a restart of the device, wherein the snapshot is loaded into the memory in lieu of loading the one or more programs, and wherein the snapshot is updated in accordance with the update of the first program during the restart of the device.

18. The method of claim 1, wherein the secured portion stores data including at least one of a password or financial information, which are excluded from the snapshot.

* * * * *